United States Patent [19]

Katayama

[11] Patent Number: 4,573,808
[45] Date of Patent: Mar. 4, 1986

[54] PNEUMATIC JOURNAL BEARING
[75] Inventor: Kaoru Katayama, Yokohama, Japan
[73] Assignee: Nissan Motor Co., Ltd., Japan
[21] Appl. No.: 694,005
[22] Filed: Jan. 23, 1985
[30] Foreign Application Priority Data Feb. 10, 1984 [JP] Japan .................................. 59-24085

[51] Int. Cl.4 ........................ F16C 32/06; F16C 37/00
[52] U.S. Cl. .................................... 384/114; 384/278;
384/900; 415/111
[58] Field of Search ........................ 384/100, 114–120,
384/276–278, 280, 287, 313, 316, 398, 900, 905;
415/112, 110, 111, 113

[56] References Cited
U.S. PATENT DOCUMENTS 3,058,785 10/1962 Steele ................................. 384/114
3,605,441 9/1971 Hagemeister ................... 415/112 X
4,256,441 3/1981 Arora .............................. 384/276 X

FOREIGN PATENT DOCUMENTS 1575358 1/1970 Fed. Rep. of Germany ...... 384/114
1264010 5/1961 France ................................ 415/113
1249863 10/1971 United Kingdom ................ 384/114
1294378 10/1972 United Kingdom ................ 384/114

Primary Examiner—Stuart S. Levy
Assistant Examiner—Thomas R. Hannon
Attorney, Agent, or Firm—Lane and Aitken

[57] ABSTRACT

A pneumatic journal bearing suitable for application to a rotating shaft which will acquire high temperature during operation, such as the turbine shaft in an automotive turbocharger. In this journal bearing, the cylindrical hole of the bearing body has a diameter considerably larger than the diameter of the shaft rotating therein. A hollow cylindrical journal member having an inner diameter substantially larger than the diameter of the shaft is coaxially disposed in the bearing hole and coaxially fixed to the shaft at two end plates of the cylindrical journal member, and compressed air is introduced into a clearance space between the journal member and the cylindrical bearing surface. Since the cylindrical major portion of the journal member is spaced from the shaft, the journal member does not undergo such significant thermal expansion as results in significant narrowing of the clearance space even though the shaft acquires high temperature. Preferably, the journal member is formed with some through-holes to admit compressed air into the interior space to thereby cool the shaft.

5 Claims, 5 Drawing Figures

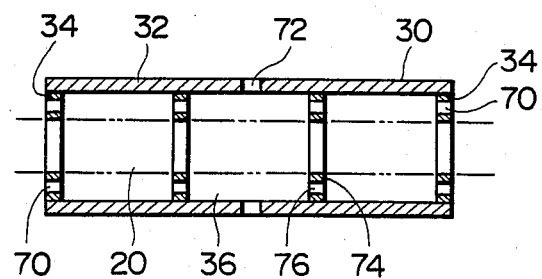
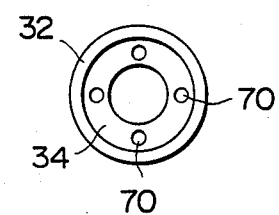
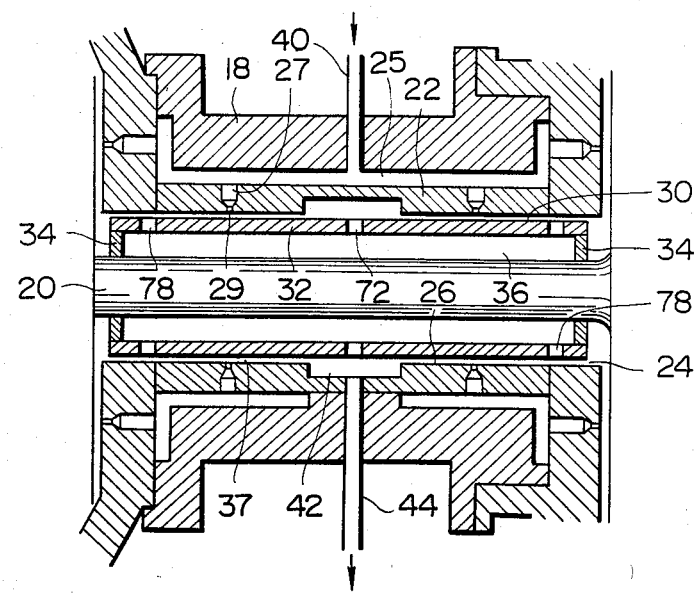

PNEUMATIC JOURNAL BEARING

BACKGROUND OF THE INVENTION

This invention relates to a pneumatic journal bearing suitable for application to a rotating shaft which acquires considerably high temperature during operation as in the case of a gas turbine shaft or an automotive turbocharger shaft, for example.

Pneumatic bearings, viz. gas-lubricated bearings, are used in various fields despite the need for the provision of a compressor for the feed of a pressurized gas, because pneumatic bearings have important advantages such as low friction torque, very smooth rotation and practicability at both high and low temperatures.

However, trouble arises in a pneumatic journal bearing if the shaft rotating in the bearing acquires high temperature and undergoes significant thermal expansion. For example, in an automotive turbocharger, the shaft connecting the turbine wheel and the compressor impeller is liable to undergo significant thermal expansion due to the conduction of considerable heat thereto from the turbine wheel which is driven by high temperature exhaust gases. Normally, the shaft as the journal in a pneumatic bearing is kept floating off the bearing surface by the action of compressed air introduced into the clearance space between the bearing surface and the shaft. However, the clearance space narrows as the shaft undergoes thermal expansion because the bearing part remains at a relatively low temperature without undergoing corresponding thermal expansion. It is not rarely that the clearance space becomes so narrow that the shaft makes sliding contact with the bearing surface by the influence of vibrations of the machine during its high speed operation. Then, wearing or seizing of the bearing and the shaft becomes a serious problem, and even breakage of the bearing or the shaft is probable in an extreme case.

SUMMARY OF THE INVENTION

It is an object of the present invention to provide an improved pneumatic journal bearing in which the clearance space between the bearing surface and the journal part does not significantly change even though the shaft rotating in the bearing acquires a considerably high temperature.

This invention provides a pneumatic journal bearing which comprises a generally cylindrical bearing body having a cylindrical bearing surface on the inner side, a rotatable shaft which has an outer diameter substantially smaller than the diameter of the cylindrical bearing surface and extends coaxially through the cylindrical space defined by the bearing surface, a cylindrical journal member which comprises a hollow cylinder having an inner diameter substantially larger than the outer diameter of the shaft and an outer diameter slightly smaller than the diameter of the bearing surface and two end plates each of which has an opening through which the shaft extends and is fixed to both the shaft and the hollow cylinder such that the hollow cylinder is held coaxial with and spaced from the shaft so as to define a cross-sectionally annular space around the shaft and so as to leave a clearance space of a predetermined width between the outer surface thereof and the bearing surface, and gas passage means for introducing a pressurized gas into the clearance space.

In this pneumatic journal bearing, the rotating shaft itself does not serve as a journal. The journal part is a hollow cylinder that rotates together with the shaft and is almost entirely spaced from the shaft. That is, the hollow cylinder joins with the shaft only in very small areas via the end plates of the journal member. Therefore, heat does not easily transfer from the shaft to the hollow cylindrical journal part. For this reason, the journal part in this pneumatic bearing does not undergo significant thermal expansion even though the shaft itself acquires a considerably high temperature as in the case of the shaft extending from the turbine wheel of an automotive turbocharger, and accordingly the existence of a suitable clearance space between the bearing surface and the journal part is ensured.

Preferably, a suitable number of relatively small through-holes are bored in the cylindrical journal member so as to provide flow communication between the aforementioned cross-sectionally annular space in the journal member and the spaces outside the journal member. By doing so, a portion of the pressurized gas introduced into the clearance space in the bearing flows into the interior of the cylindrical journal member, and flows out, with the effect that the shaft is cooled by the gas. Therefore, the transfer of heat from the shaft to the journal member is further reduced so that the clearance space in the bearing becomes further stable.

As will be understood from the above description of the constructional features, the bearing according to the invention retains the principal advantages of pneumatic journal bearings.

BRIEF DESCRIPTION OF THE DRAWINGS

FIG. 3 is a longitudinal sectional view of a journal part of a pneumatic bearing as another embodiment of the invenion;

FIG. 4 is an end view of the journal part of FIG. 3; and

FIG. 5 shows, in a longitudinal sectional view, a partial modification of the journal part in the pneumatic bearing of FIG. 1.

DESCRIPTION OF THE PREFERRED EMBODIMENTS

Figure 1:
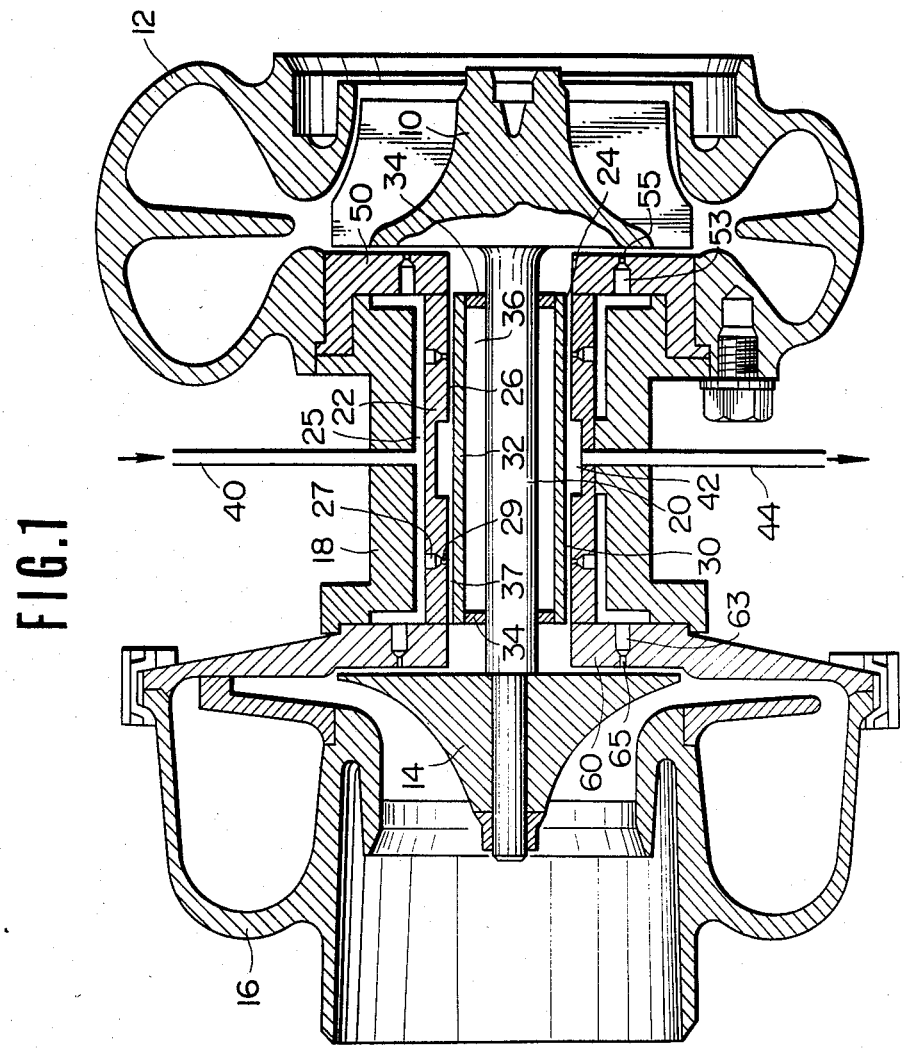
FIG. 1 is a longitudinal sectional view of an automotive turbocharger comprising a pneumatic bearing as an embodiment of the invention.

FIG. 1 shows an automotive turbocharger to which the present invention is applied by way of example. As usual, the turbocharger includes a turbine wheel 10 which rotates in a turbine housing 12, and a compressor impeller 14 which rotates in a compressor housing 16. A center housing 18 intervenes between the turbine and the compressor.

The turbine wheel 10 and the compressor impeller 14 are connected by a cylindrical shaft 20 which becomes a common axis of rotation. A cylindrical bearing 22 is fitted in the center housing 18 such that the shaft 20 extends coaxially in the cylindrical hole 24 of the bearing 22. There is a relatively wide gap between the cylindrical inner surface 26 of the bearing 22 and the outer surface of the shaft 20. A hollow cylindrical journal member 30 is coaxially fitted around the shaft 20. This journal member 30 has a cylindrical wall 32 and two end plates 34 each of which has a center hole. The cylindrical wall 32 has an inner diameter fairly larger than the diameter of the shaft 20 and substantially the same length as the cylindrical bearing 22. The journal member 30 is fixed to the shaft 20 at the two end plates 34 by, for example, tightly fitting the shaft 20 in the center holes of the end plates 34, so that the cylindrical wall 32 is kept spaced from the shaft 20. Thus, a cross-sectionally annular space 36 is defined between the shaft 20 and the wall 32 of the cylindrical journal member 30. The inner diameter of the bearing 22 and the outer diameter of the journal member 30 are adjusted such that a clearance space 37 of a predetermined width, which is 20–30 μm in this embodiment, exists between the bearing surface 26 and the outer surface of the journal member 30.

The cylindrical bearing 22 is formed with a plurality of radial holes 27 each of which has a constricted nozzle section 29 that opens in the bearing surface 26. These holes 27 are arranged at approximately equal circumferential intervals and at approximately equal axial intervals. There is a cross-sectionally annular space 25 between the outer surface of the bearing 22 and the wall of the center housing 18, and an air intake pipe 40 extends from a compressor (not shown) into the center housing 18 so as to open into this space 25. The holes 27 serve as air intake holes which provide flow communication between the space 25 and the clearance space 37 in the bearing. A circumferential groove 42 is formed in a middle region of the cylindrical bearing surface 26, and an air discharge pipe 44 extends through the bearing 22 and the center housing 18 to provide flow communication between the clearance space 37 and the atmosphere via the groove 42.

For the turbine wheel 10, there is a thrust bearing 50 which is formed with a plurality of air intake holes 53. Each of these air intake holes 53 communicates with the space 25 in the center housing 18 and has a constricted nozzle section 55 which opens in the thrust bearing surface to the turbine wheel 10. For the compressor impeller 14, there is a thrust bearing 60 which is formed with a plurality of air intake holes 63, each of which communicates with the aforementioned space 25 and has a constricted nozzle section 65 which opens in the thrust bearing surface to the impeller 14.

In operation of the turbocharger, compressed air is supplied into the interior of the center housing 18 via the air intake pipe 40. The compressed air jets out from the nozzle sections 29 of the air intake holes 27 toward the cylindrical wall 32 of the journal member 30 with the effect that the journal member 30 remains floating off the cylindrical bearing surface 26. Simultaneously the compressed air jets out of the nozzles 55 of the air intake holes 53 to keep the turbine wheel 10 floating off the thrust bearing 50, and also from the nozzles 65 of the air intake holes 53 to keep the compressor impeller 14 floating off the thrust bearing 60. Thus, the shaft 20 fixed to the cylindrical journal member 30 is freely rotatably supported by the compressed air.

As the turbine 10 is driven by high temperature exhaust gases, which may be as hot as about 900° C., the shaft 20 acquires a considerably high temperature by the conduction of heat from the turbine 10 to the shaft 20. However, the heat does not easily transfer from the shaft 20 to the cylindrical journal member 30 because the cylindrical wall 32 of the journal member 30 is spaced from the shaft 20 and connects with the shaft 20 only via the end plates 34 which are in contact with the shaft in very small areas. Therefore, the journal member 30 does not reach such a high temperature as will cause significant thermal expansion of this member 30 even though the shaft 20 reaches such a high temperature. In other words, an inevitable rise in the temperature of the shaft 20 does not result in a significant change in the width of the clearance space 37 between the bearing surface 26 and the cylindrical journal member 30. For this reason, it is very unlikely that the journal member 30 comes into sliding contact with the bearing surface 26 during operation of the turbocharger, and therefore the pneumatic journal bearing in FIG. 1 continues to exhibit good bearing performance without suffering from wearing or seizing.

Figure 2:
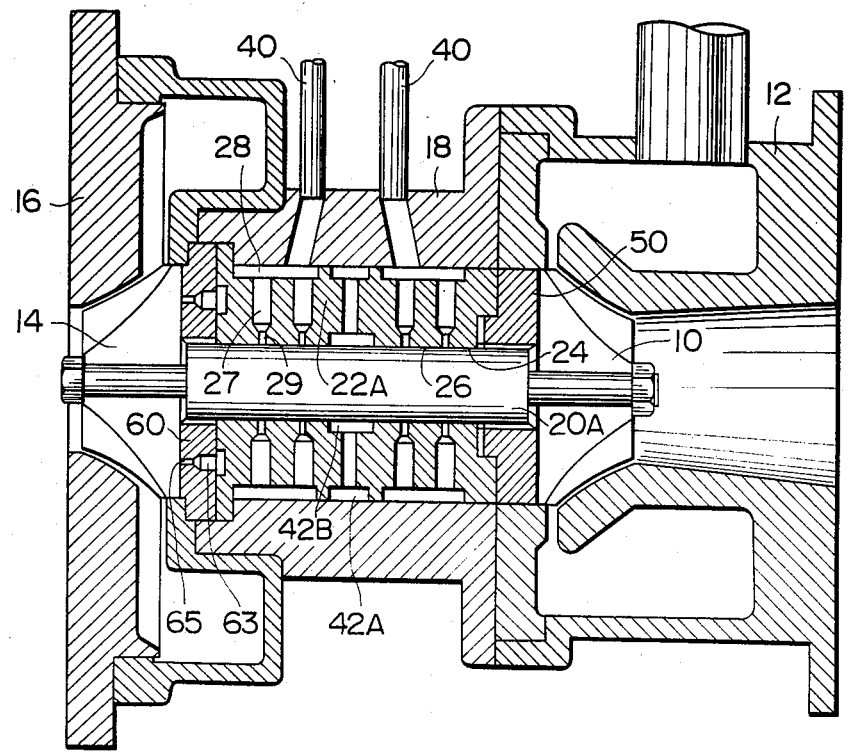
FIG. 2 is a longitudinal sectional view of an automotive turbocharger comprising a conventional pneumatic bearing.

For comparison, FIG. 2 shows the application of a conventional pneumatic journal bearing to the turbocharger of FIG. 1. In this case, a cylindrical bearing 22A for the shaft 20A has an inner diameter very close to the outer diameter of the shaft 20A since the shaft 20A itself serves as the journal part of the bearing. On the radially outer side, the bearing 22A is formed with circumferential grooves 28 which provide flow communication between air intake pipes 40 and the air intake holes 27 and another circumferential groove 42A which communicates with an air discharge groove 42B formed on the radially inner side and also with an air discharge pipe (not shown). In operation, the shaft 20A is floating off the cylindrical bearing surface 26 by the action of the compressed air jetted out from the nozzle sections 29 of the air intake holes 27. However, the shaft 20A undergoes significant thermal expansion as the conduction of heat thereto from the turbine 10 continues, whereas the bearing 22A does not undergo corresponding thermal expansion because of the cooling effect of the compressed air. Consequently, there occurs a significant decrease in the width of the clearance space between the shaft 20A and the bearing surface 26, and it is not rarely that the rotating shaft 20A comes into sliding contact with the bearing surface 26.

Referring to FIGS. 3 and 4, it is preferable to bore a plurality of through-holes 70 in each end plate 34 of the journal member 30 in FIG. 1 and a plurality of through-holes 72 in the cylindrical wall 32 of the same member 30. In each end plate 34 the through-holes 70 are arranged at approximately equal angular intervals, and the through-holes 72 in the cylindrical wall 32 are located in a middle section opposite the circumferential groove 42 of the bearing 22 in FIG. 1 and are arranged circumferentially at approximately equal intervals. If necessary, reinforcing plates 74 may be fitted in the cylindrical journal member 30. Of course each reinforcing plate 74 has a center hole through which the shaft 20 extends. It is optional to use these reinforcing plates 74 too for fixing the journal member 30 to the shaft 20. When the journal member 30 is formed with the through-holes 70 and 72, each reinforcing plate 74 too is formed with through-holes 76 similarly to the end plates 34.

The through-holes 70 in the end plates 34 of the journal member 30 allow the compressed air to enter the space 36 in the journal member 30, while the through-holes 72 in the cylindrical wall 32 provides flow communication between this space 36 and the groove 42 which connects with the air discharge pipe 44. Therefore, a portion of the compressed air blown into the clearance space 37 between the bearing 22 and the journal member 30 flows through the interior space 36. Then, not only the journal member 30 but also the shaft 20 is cooled by the compressed air with the effect that thermal expansion of the journal member 30 is further suppressed so that the width of the clearance space 37 becomes very stable. Since the through-holes 70 and 72 are fairly distant from the bearing surface 26, the presence of these holes 70, 72 does not adversely affect the performance of the journal bearing.

FIG. 5 shows another modification of the journal member 30 in FIG. 1. In this case the cylindrical wall 32 of the journal member 30 is longer than the cylindrical bearing 22 so that both end portions of the journal member 30 do not face to the bearing surface 26. Similarly to the counterpart in FIG. 3, the journal member 30 of FIG. 5 is formed with radial through-holes 72 in a middle section opposite the circumferential groove 42 of the bearing 22. In addition, radial through-holes 78 are bored in the end portions of the extended cylindrical wall 32 such that none of these holes 78 are right opposite the bearing surface 26. In each end portion these through-holes 78 are arranged circumferentially at approximately equal intervals. In this journal member 30 the end plates 34 have no holes corresponding to the holes 70 in FIGS. 3 and 4.

In the case of FIG. 5, a portion of the compressed air blown into the clearance space 37 flows into the space 36 in the journal member 30 through the holes 78 in the end portions and flows out through the holes 72 in the middle section. Therefore, the shaft 20 is effectively cooled in the same manner as in the case of using the journal member 30 of FIGS. 3 and 4. As an advantage of the journal member 30 of FIG. 5, the end plates 34 have higher strength since no air-passing holes are bored therein.

It should be understood that the above described embodiments are only exemplary and that the present invention is applicable to various kinds of machines, including gas turbines, in which a rotating shaft needs a journal bearing and will acquire high temperature during operation.

What is claimed is:

1. A pneumatic journal bearing comprising:
   a generally cylindrical bearing body having a cylindrical bearing surface on the inner side:
   a rotatable torque or power transmitting shaft which has an outer diameter substantially smaller than the diameter of said cylindrical bearing surface and extends coaxially through the cylindrical space defined by said bearing;
   a cylindrical journal member which comprises a hollow cylinder having an inner diameter substantially larger than the outer diameter of said shaft and an outer diameter slightly smaller than the diameter of said bearing surface and two end plates each of which is a disk tightly fitted into an endmost section of the cylindrical journal member, has an opening through which said shaft extends, and is fixed to both said shaft and said hollow cylinder such that said hollow cylinder is held coaxial with and spaced from said shaft so as to define a cross-sectionally annular space around said shaft and so as to leave a clearance space of a predetermined width between the outer surface thereof and said bearing surface; and
   gas passage means for introducing a pressurized gas into said clearance space, whereby said journal member from said shaft prevents change in the width of said clearance space when said said shaft is heated to a high temperature.

2. A pneumatic journal bearing according to claim 1, wherein said cylindrical journal member is formed with a plurality of through-holes which are arranged so as to admit a portion of the pressurized gas introduced into said clearance space into said cross-sectionally annular space and so as to allow the admitted gas to flow out, thereby cooling said rotatable shaft, whereby change in the width of said clearance space when said shaft is heated is reduced.

3. A pneumatic journal bearing according to claim 2, wherein a portion of said through-holes are bored in said hollow cylinder and the remaining portion in said end plates.

4. A pneumatic journal bearing according to claim 3, wherein a circumferential groove is formed in said cylindrical bearing surface such that said through-holes bored in said hollow cylinder open to said circumferential groove.

5. A pneumatic journal bearing according to claim 2, wherein said hollow cylinder has a length greater than the length of said cylindrical bearing surface and is positioned such that both end portions of said hollow cylinder are not opposite said bearing surface, at least a portion of said through-holes being bored in said end portions of said hollow cylinder.

* * * * *